US007330489B1

(12) United States Patent
Benning et al.

(10) Patent No.: US 7,330,489 B1
(45) Date of Patent: Feb. 12, 2008

(54) DISTRIBUTED DATA SYNCHRONIZATION APPARATUS AND METHOD

(75) Inventors: Michael A. Benning, Roseville, CA (US); Mick R. Jacobs, Auburn, CA (US)

(73) Assignee: Cisco Technology, Inc., San Jose, CA (US)

( * ) Notice: Subject to any disclaimer, the term of this patent is extended or adjusted under 35 U.S.C. 154(b) by 1006 days.

(21) Appl. No.: 10/304,926

(22) Filed: Nov. 26, 2002

(51) Int. Cl.
*H04J 3/07* (2006.01)

(52) U.S. Cl. ............ 370/506; 370/509; 370/514; 375/260; 375/365; 713/375; 713/400; 714/700

(58) Field of Classification Search ............ 370/509, 370/512, 513, 514, 536, 537, 542, 503, 506, 370/510, 511, 516, 517, 519, 520, 522; 375/260, 375/354, 371; 713/375, 400, 401, 500, 503; 714/699, 700
See application file for complete search history.

(56) References Cited

U.S. PATENT DOCUMENTS

| | | | | |
|---|---|---|---|---|
| 5,293,378 A * | 3/1994 | Shimizu | | 370/474 |
| 5,414,698 A * | 5/1995 | Adams | | 370/235 |
| 5,687,181 A * | 11/1997 | Suemura et al. | | 714/757 |
| 5,852,630 A * | 12/1998 | Langberg et al. | | 375/219 |
| 6,377,575 B1 * | 4/2002 | Mullaney et al. | | 370/360 |
| 6,584,535 B1 * | 6/2003 | Ouellet et al. | | 710/305 |
| 6,646,991 B1 * | 11/2003 | Drottar et al. | | 370/238 |
| 6,687,840 B1 * | 2/2004 | Drottar et al. | | 713/401 |
| 6,925,135 B2 * | 8/2005 | Smith et al. | | 375/354 |
| 6,980,616 B1 * | 12/2005 | Nakano et al. | | 375/364 |
| 7,206,955 B2 * | 4/2007 | Drottar et al. | | 713/401 |

OTHER PUBLICATIONS

Fukaishi et al, "A 20Gb/s CMOS Multi-Channel Transmitter and Receiver Chip Set for Ultra-High Resolution Digital Display", IEEE Solid-State Circuits Conference 2000, Feb. 7-9, 2000, pp. 260-261.*
Fukaishi et al., "A 4.25 Gb/s CMOS Fiber Channel Transceiver with Asynchronous Tree-Type Demultiplexer and Frequency Conversion Architecture", IEEE Journal of Solid-State Circuits, Dec. 1998, pp. 2139-2147.*

* cited by examiner

*Primary Examiner*—Hassan Kizou
*Assistant Examiner*—Brian T O'Connor
(74) *Attorney, Agent, or Firm*—Campbell Stephenson LLP

(57) ABSTRACT

Disclosed is a method and apparatus for synchronizing data in a number of separate integrated circuits. In one embodiment, the apparatus includes a first integrated circuit configured to receive first data, and a second integrated circuit coupled to the first integrated circuit configured to receive second data. The second integrated circuit is separate from the first integrated circuit. The second integrated circuit is further configured to synchronize the second data with the first data. In another embodiment, the apparatus includes a first integrated circuit configured to receive first data, and a second integrated circuit coupled to the first integrated circuit configured to receive second data. The second integrated circuit is separate from the first integrated circuit. The second integrated circuit is further configured to detect when the second data is out of synchronization with the first data.

32 Claims, 6 Drawing Sheets

US 7,330,489 B1

DISTRIBUTED DATA SYNCHRONIZATION APPARATUS AND METHOD

BACKGROUND OF THE INVENTION

It is often the case that one or more integrated circuits are configured to divide a data stream into portions of data, and transmit the portions of data synchronously to a number of separate integrated circuits over a number of transmission lines. For example, a stream of N-bit input data may be split into eight equal portions and each N/8-bit portion synchronously transmitted to eight separate integrated circuits. Although eight has been used in this example, the concept applies to any number of divisions of data transmitted to any number of separate integrated circuits.

However, for a number of reasons (e.g., physical structure of transmission lines and/or operating conditions), the N/8-bit portions may be received by each separate integrated circuit out of synchronization with each other. For example, suppose an N-bit input data value X is provided by a transmitting integrated circuit at time $t_1$. X is divided into N/8-bit data portions $X_1$-$X_8$ and synchronously transmitted to eight separate integrated circuits over eight transmission lines. However, because of the relative time delays between transmission lines, $X_1$ may be received by a first receiving integrated circuit one or more clock cycles after $X_2$ is received by a second separate receiving integrated circuit. As such, $X_1$ and $X_2$ are out of synchronization. Because $X_1$ and $X_2$ are out of synchronization, $X_1$-$X_8$ cannot be concatenated to reproduce X at an output node coupled to each of the separate receiving integrated circuits.

SUMMARY OF THE INVENTION

Disclosed is a method and apparatus for synchronizing data received by a number of separate integrated circuits. In one embodiment, the apparatus includes a first integrated circuit configured to receive first data, and a second integrated circuit coupled to the first integrated circuit configured to receive second data. The second integrated circuit is separate from the first integrated circuit. The second integrated circuit is further configured to synchronize the second data with the first data.

In another embodiment, the apparatus includes a first integrated circuit configured to receive first data, and a second integrated circuit coupled to the first integrated circuit configured to receive second data. The second integrated circuit is separate from the first integrated circuit. The second integrated circuit is further configured to detect when the second data is out of synchronization with the first data.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
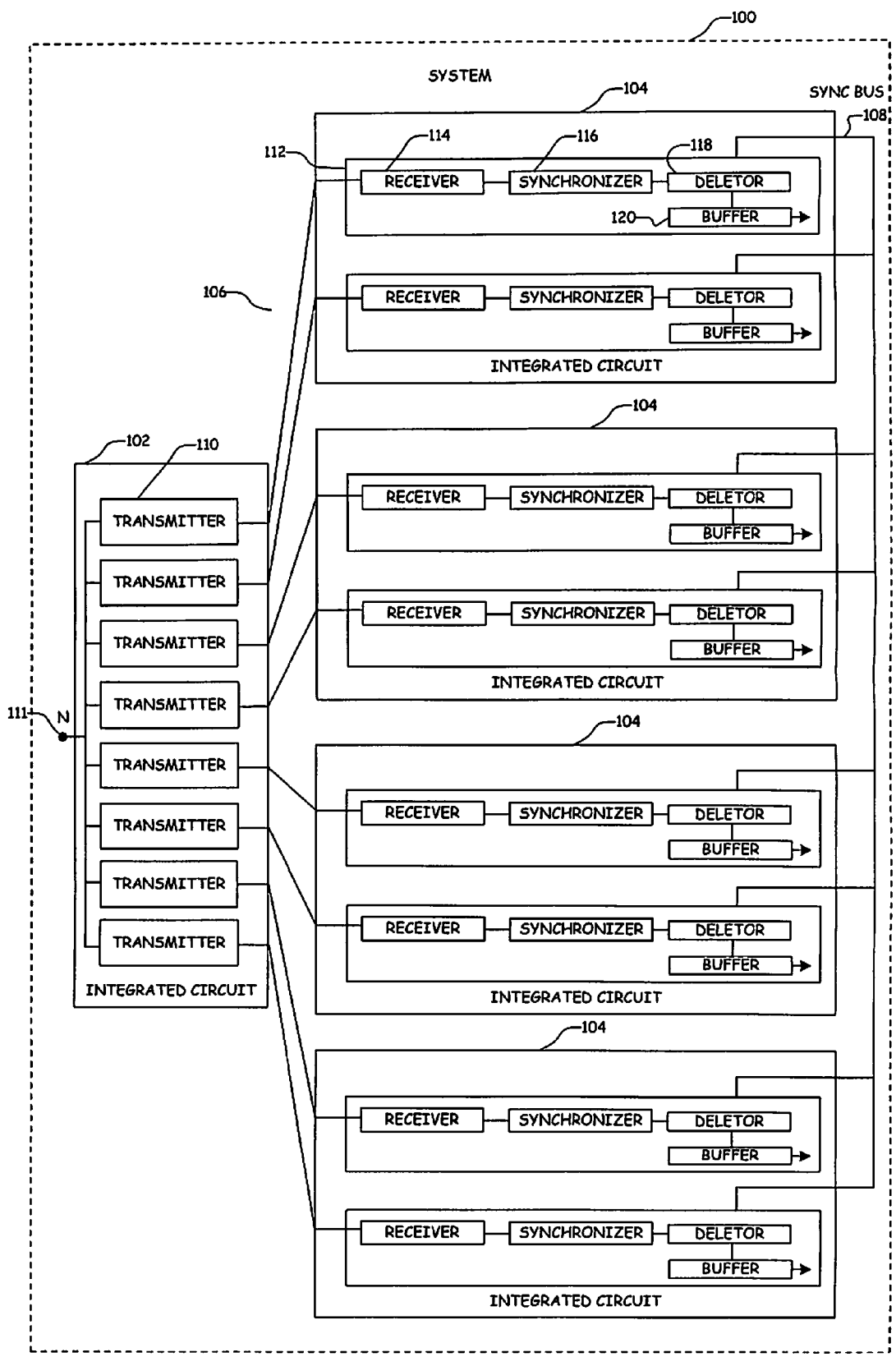
FIG. 1 is a block diagram of a system including exemplary synchronizers used to align data signals in accordance with the present invention.

FIG. 1 illustrates a system 100 employing one embodiment of the present invention. In the presently described embodiment, system 100 is a switch used for transmitting data across a network. In other embodiments of the present invention, however, system 100 may be any data processing system having a need for synchronizing data that is received out of synchronization (e.g., a computer system).

System 100 includes an integrated circuit 102 coupled to integrated circuits 104 via communication links 106. Integrated circuits 104 are coupled to each other via synchronization bus 108. In the present invention, integrated circuit 102 and each integrated circuit 104 are separate integrated circuits. For example, integrated circuit 102 and each integrated circuit 104 reside on separate substrates. Although FIG. 1 illustrates four integrated circuits 104, the present invention can be employed with preferably two or more. Also in the presently described embodiment, communication links 106 are serial communication links, however, it is understood that the present invention may find application to a system employing parallel, or other, communication links.

Integrated circuit 102 includes eight transmitters 110. Each transmitter 110 is coupled to an integrated circuit 104 via communication link 106. Although FIG. 1 illustrates eight transmitters 110, the present invention can be employed with more or less than eight. Transmitters 110 are configured to synchronously provide data to communication links 106. For example, in one embodiment of the present invention, a data stream of N-bits is provided to input node 111, where it is divided into eight equal data portions for each transmitter 110. The N/8-bit data portions are synchronously provided to respective inputs of transmitters 110. Each transmitter 110 transmits an N/8-bit data portion on respective communication links 106 synchronously with the other transmitters 110. In one embodiment of the present invention, transmitters 110 are configured to transmit data at a rate of 3.125 Gbit/sec using 8B10B encoding.

Each integrated circuit 104 includes two input synchronization circuits 112, although the present invention can be employed with more or less than two. As illustrated in FIG. 1, input synchronization circuits 112 are coupled to each other via synchronization bus 108. Each input synchronization circuit 112 includes a receiver 114, a synchronizer 116, a deletor 118, and a buffer 120. Receiver 114 is coupled to communication link 106 and to synchronizer 116. In turn, synchronizer 116 is coupled to deletor 118. Deletor 118 is coupled to buffer 120.

For any number of reasons, including operating conditions, and/or structural differences, the transmission time of each N/8-bit data portion across each communication link 106 may not be the same. Consequently, the N/8-bit data portions received by each input synchronization circuit 112 may be out of synchronization with each other. If the N/8-bit data portions are out of synchronization with each other, each input synchronization circuit 112 operates to resynchronize each N/8-bit data portion such that the N/8-bit data portions are provided into buffers 120 in synchronization with each other.

As will be described in more detail below, input synchronization circuits 112 operate in a master-slave configuration. In this configuration, one input synchronization circuit 112 is a master, and each other input synchronization circuit 112 is a slave. Resynchronization is accomplished, in part, by synchronizing the N/8-bit data at each slave input synchronization circuit with the N/8-bit data at the master input synchronization circuit.

Regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing described embodiment wherein the different components are contained within different other components (e.g., the various elements of integrated circuit 102). It is to be understood that such depicted architectures are merely examples and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

Figure 2:
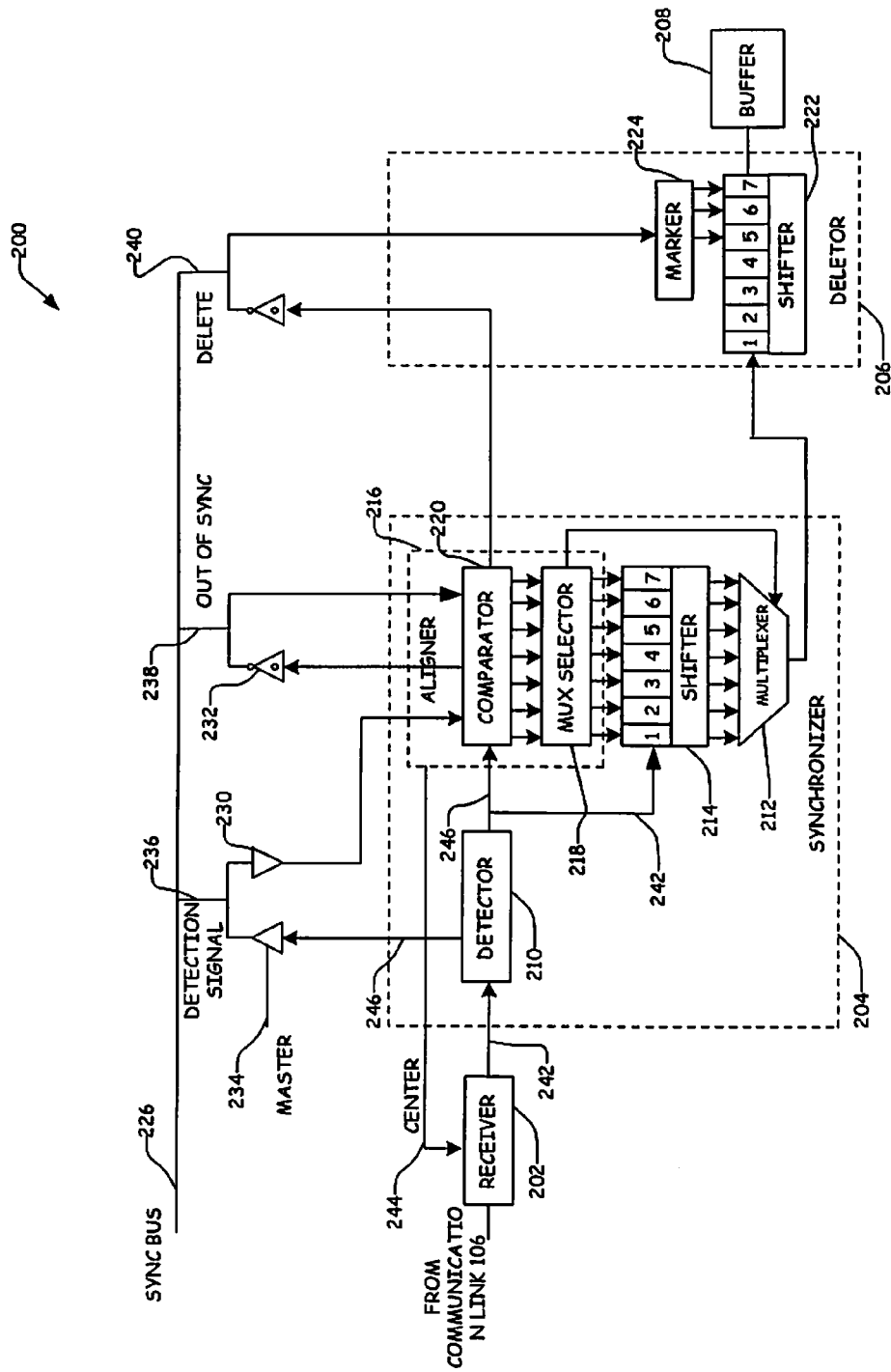
FIG. 2 is a block diagram illustrating one embodiment of a synchronizer according to the present invention.

FIG. 2 illustrates a block diagram of an exemplary input synchronization circuit 200, in accordance with the present invention. Input synchronization circuit 200 is an exemplary implementation of synchronization circuits 112 of FIG. 1. Input synchronization circuit 200 includes a receiver 202, a synchronizer 204, a deletor 206, and a buffer 208. Synchronizer 204 includes a detector 210, a multiplexer 212, a shifter 214, and an aligner 216. Aligner 216 further includes a mux selector 218 and a comparator 220. Deletor 206 includes a shifter 222 and a marker 224.

Synchronizer 204 and deletor 206 are coupled to synchronization bus 226 via signal buffers 230 and open collectors 232. A master signal 234 is also coupled to synchronization bus 226 via signal buffer 230. By asserting master signal 234, an input synchronization circuit 200 can drive a detection signal 236 onto synchronization bus 226. Either a master input synchronization circuit or slave input synchronization circuit may drive an out of synchronization signal 238 and/or a delete signal 240 onto synchronization bus 226. Driving a signal onto synchronization bus 226 provides the signal to each input synchronization circuit 200 coupled to synchronization bus 226.

Receiver 202 is coupled to detector 210 and aligner 216 via a communication link 242 and a center signal 244, respectively. Communication link 242 is at least N/8-bits wide in the presently described embodiment, although in other embodiments communication link 242 may be wider or narrower. In operation, receiver 202 is configured to decode data received from communication link 106 (coupled to, for example, a transmitter 110 of FIG. 1) and provide the decoded data to detector 210, adjusting for any clock differences between communication link 106 and communication link 242. For example, in the presently described embodiment, receiver 202 is configured to receive data from communication link 106 at a rate approximate to 3.125 Gbit/sec and decode the data via an 8B10B decoder (not shown). Receiver 202 is further configured to utilize a clock boundary FIFO (not shown) to provide the decoded data to communication link 242 at a rate approximate to ⅒ the incoming rate, or 312.5 MHz. It will be recognized that many alternative communication link frequencies and decode options are suitable, and based on the description herein, those of skill in the art will appreciate suitable modifications to the exemplary receiver.

Detector 210 is coupled to synchronization bus 226 via communication link 246 and signal buffer 230. Detector 210 is also coupled to shifter 214 via communication link 242. In the present embodiment, communication link 242 is N/8-bits wide and communication link 246 is 4-bits wide, although in other embodiments communication link 242 and 246 may be wider or narrower than N/8-bits and 4-bits, respectively. In operation, detector 210 is configured to generate a detection signal for data received from receiver 202. In the presently described embodiment, the data detection signal is a 2-bit signal identifying the type of data received from receiver 202. Table 1 provides a mapping of the 2-bit data detection signal to the data type. It will be recognized that similar schemes may be used to identify the data type.

TABLE 1

| 2-bit detection signal | Type |
| --- | --- |
| 00 | data |
| 01 | delimiter |
| 10 | control |
| 11 | error |

Detector 210 is configured to provide the detection signal to comparator 220. Additionally, a master detector 210 (referring to a detector for the master input synchronization circuit) is configured to provide its data detection signal (i.e., the master detection signal) to each slave comparator via detection signal 236 and synchronization bus 226. As such, each comparator receives both a master data detection signal and a "local" data detection signal (for the case of the master, the two will always be equal). In the present embodiment, detection signal 236 is 4-bits wide, allowing a master detector to provide two 2-bit detection signals at once. Other embodiments may contemplate more or less than a 4-bit wide detection signal. Once having provided the data detection signal, detector 210 is configured to provide the data to shifter 214.

As mentioned above, comparator 220 is coupled to detector 210. Comparator 220 is also coupled to receiver 202 via center signal 244, and to mux selector 218. In the present embodiment, comparator 220 has seven outputs, each coupled to a respective input of mux selector 218. Comparator 220 is also coupled to out of synchronization signal 238 via an open collector 232, and to delete signal 240 via an open collector 232. In operation, comparator 220 is configured to compare the master detection signal, provided on detection signal 236, to the local detection signal provided from detector 210 on communication link 246. If the data detection signals do not match, comparator 220 is configured to drive out of synchronization signal 238. Comparator 220 is also configured to center the clock boundary FIFO of receiver 202 by asserting center signal 244. As will be described in more detail below, driving an out of sync signal will configure each slave input synchronization circuit to resynchronize its data with data of the master input synchronization circuit.

Comparator 220 also has the ability to drive delete signal 240 on the event that comparator 220 detects that data is out of synchronization or which has errors associated with it. For example, in the present embodiment, receiver 202 can detect parity errors, and other similar errors, of data received from communication link 106 and encode the error information in the data. Comparator 220 will recognize this error information and drive delete signal 240 in the event such an error is detected.

In the presently described embodiment, shifter 214 includes seven shift register stages designated 1, 2, 3, . . . 7, although it will be recognized that shifter 214 may have fewer or more than seven shift register stages in other embodiments of the present invention. Each shift register stage is at least N/8-bits wide and is capable of storing N/8-bits of data. Other embodiments of the present invention may contemplate shift register stages wider than N/8-bits. The input of each shift register stage is coupled to a respective output of mux selector 218, while the output of each shift register stage is coupled to a respective input of multiplexer 212. The output of each shift register stage is also coupled to the respective input of a successive shift register stage, thus allowing shifting. In operation, shifter 214 is configured to receive data from detector 210 in the first shift register stage, and shift the data to the next shift register stage or out of the shift register to multiplexer 212. Multiplexer 212 is configured to provide an N/8-bit data portion on the output of multiplexer 212, as determined by mux selector 218.

Deletor 206 includes a shifter 222 and a marker 224. In the present embodiment, shifter 222 includes seven shift register stages, similar to shifter 214. The input of the first shift register stage of shifter 222 is coupled to the output of multiplexer 212, while the output of the last shift register stage of shifter 222 is coupled to the input of buffer 208. In operation, shifter 222 is configured to receive data from multiplexer 212 in the first shift register stage, and shift the data to the next shift register stage or out of the shift register to buffer 208.

Marker 224 is coupled to delete signal 240 (and thus, coupled to synchronization bus 226) via open collector 232. Marker 224 is also coupled to a number of (e.g., three) shift register stages of shifter 222. In the event of receiving a delete signal from comparator 220, marker 224 is configured to encode a deletion marker in the data (i.e., mark the data) in a number of stages (e.g., stages 5, 6, and 7) of shifter 222. Because delete signal 240 is common to each input synchronization circuit 200 via synchronization bus 226, each marker 224 of each input synchronization circuit 200 is configured to mark the data in the same shift register stages of each shifter 222 at the same time. Upon receiving marked data, buffer 208 is configured to delete all data received from shifter 222 until a delimiter is received by buffer 208. In the present embodiment, a delimiter represents N/8-bits of data signaling the start of a packet to be transmitted across a network. Further, in one embodiment of the present invention, a number of consecutive delimiters may be used to signal the start of a packet. Because the data in each buffer 208 of each input synchronization circuit 200 is configured to receive an N/8-bit portion of data synchronously, it is advantageous to configure each input synchronization circuit 200 to respond to errors simultaneously and in similar fashion.

Figure 3:
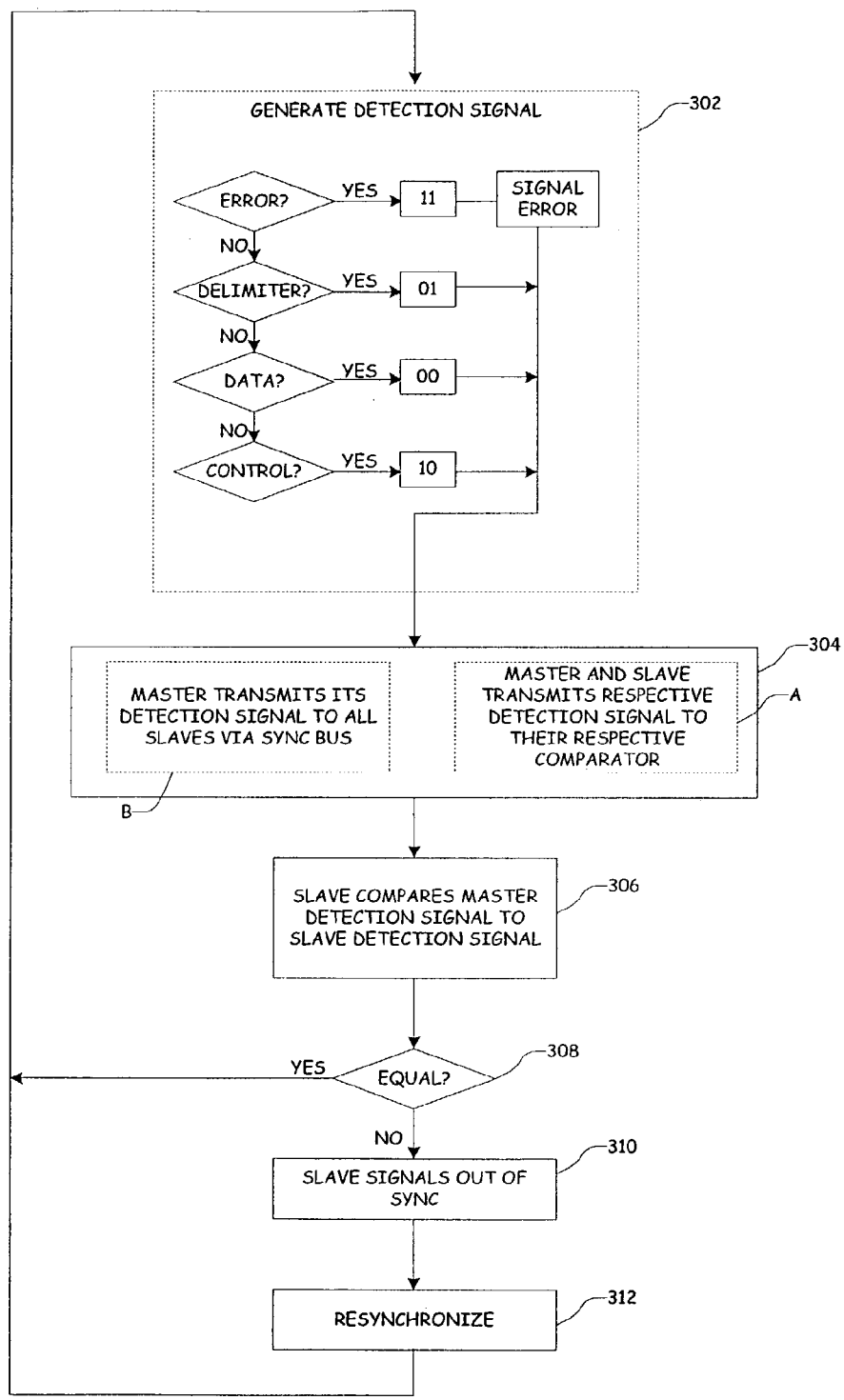
FIG. 3 is a flow chart illustrating a process of detecting when data signals are not synchronized, in accordance with one embodiment of the present invention.

FIG. 3 is a flow chart illustrating a process of detecting when data signals are not synchronized, in accordance with one embodiment of the present invention. As an aid to describing and understanding the operations of FIG. 3, FIG. 3 will be described with reference portions of input synchronization circuits 200 depicted in FIG. 4. The portions of input synchronization circuits 200 depicted in FIG. 4 are provided only for purposes of explanation and should not be taken as limiting.

Figure 4:
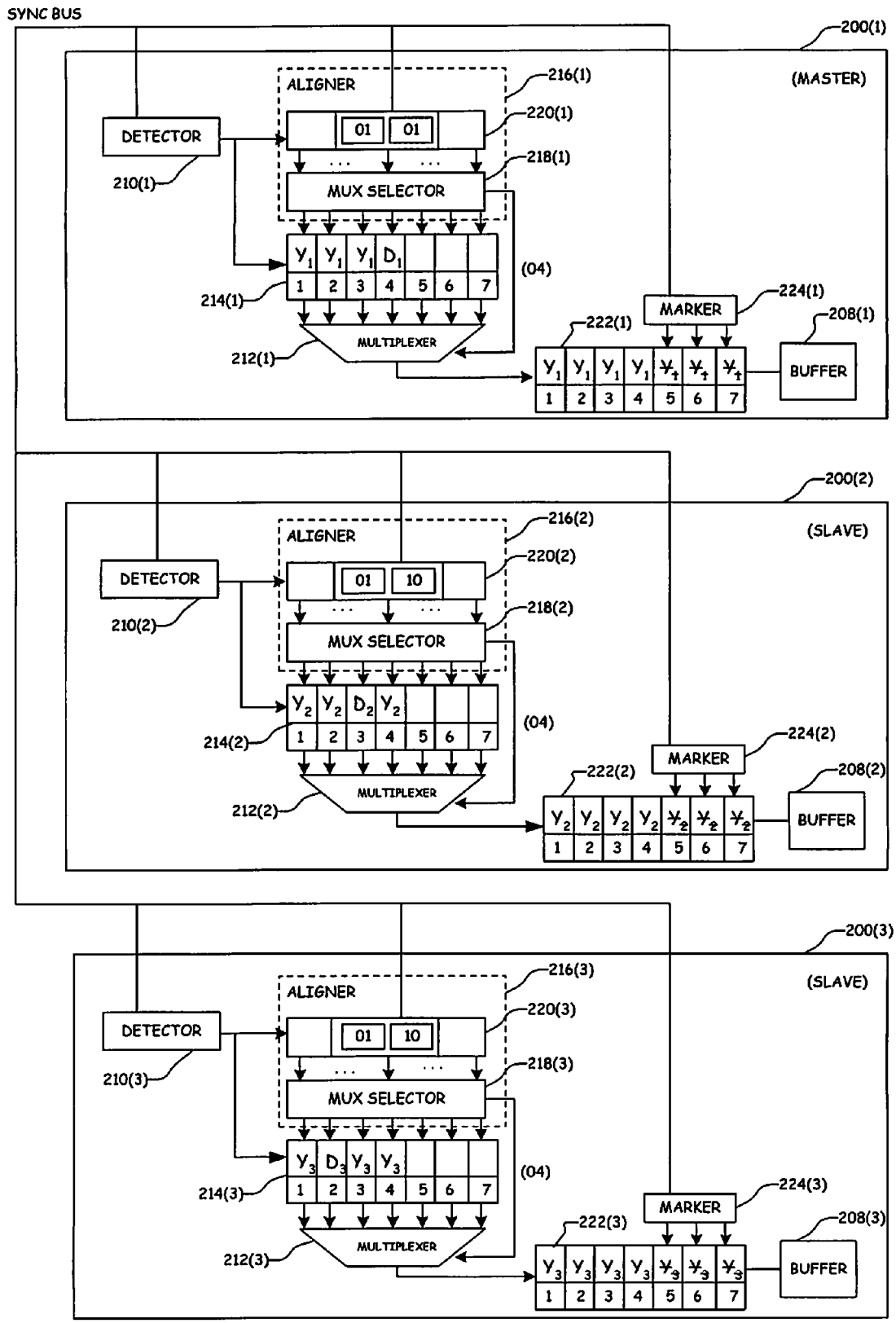
FIG. 4 is a block diagram illustrating one embodiment of synchronizers configured with data according to the present invention.

Before describing the process illustrated in FIG. 3, the configuration illustrated in FIG. 4 will briefly be described. FIG. 4 illustrates portions of three (out of a total of eight) input synchronization circuits 200. Each shifter 214 of each input synchronization circuit 200 is illustrated as including N/8-bit portions of data characters ($Y_X$) and delimiters ($D_X$), and each buffer 208 is illustrated as including N/8-bit portions of data characters ($Y_X$). The subscripts for each respective data type are used in the present description to identify the corresponding input synchronization circuit of which the data is associated. It is assumed for purposes of explanation only, that input synchronization circuit 200(1) is the master. It is further assumed that the tap setting of each multiplexer 212 is configured to output data from the fourth stage of each respective shifter 214. Also, each comparator 220 is illustrated as including a master detection signal and the respective "local" detection signal for data in the fourth stage. Looking at the fourth stage of each shifter 214 then, it can be seen that the data to be output on each multiplexer 212 is out of synchronization. More specifically, shifter 214(1) includes a delimiter $D_1$ in stage 4, while shifters 214(2) and 214(3) include data characters $Y_2$ and $Y_3$ in stages 4, respectively.

Returning now to FIG. 3, initially, upon receipt of data from receiver 202, each detector 210 generates a detection signal (block 302). As described above, the detection signal identifies the type of data. Each detector 210 provides the detection signal to the respective comparator 220 (block 304, and sub-block A). Additionally, the master detector provides its detection signal (the master detection signal) to slave comparators 220(2) and 220(3) via synchronization bus 226 (master comparator 220(1) also receives the master detection signal because it too is coupled to synchronization bus 226) (block 304, and sub-block B).

For example, for data characters $Y_2$ and $Y_3$ in the fourth stages of the shifters 214(2) and 214(3), respectively, detectors 210(2) and 210(3) generate a "local" detection signal "00" ("00" being the detection signal for a data character), respectively, and provide the detection signal to comparators 220(2) and 220(3), respectively. Similarly, for delimiter $D_1$ in the fourth stage of shifter 214(1) in the master synchronization circuit, detector 210(1) generates master detection signal "01" ("01" being the detection signal for a delimiter). The master detection signal is provided to comparator 220(1) (via both communication link 246 and also synchronization bus 226) and also to each comparator 220(2) and 220(3) (via synchronization bus 226).

Each slave comparator 220 then compares the master detection signal with their respective detection signal (block 306). If the signals match, then the process returns to block 302 to repeat the process for subsequently received data ("Yes" branch of decision block 308). However, if the detection signals are not equal, the comparator recognizing the inequality drives an out of synchronization signal on synchronization bus 226 ("No" branch of decision block 308 and block 310, respectively). Driving an out of synchronization signal on synchronization bus 226 initiates a resynchronization (described in more detail in FIG. 5 below) (block 312). For example, in the presently described example, both comparators 220(2) and 220(3) provide an out of synchronization signal on synchronization bus 226 because their respective detection signals do not match the master detection signal. Thus, with the method described herein, a number of separate integrated circuits are able to detect whether their respective data is out of synchronization with the data of another separate integrated circuit.

The operations referred to herein may be modules or portions of modules (e.g., software, firmware or hardware modules). For example, although the described embodiment includes software modules and/or includes manually entered user commands, the various example modules may be application specific hardware modules. The software modules discussed herein may include script, batch or other executable files, or combinations and/or portions of such files. The software modules may include a computer program or subroutines thereof encoded on computer-readable media.

Additionally, those skilled in the art will recognize that the boundaries between modules are merely illustrative and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, those skilled in the art will recognize that the operations described in example embodiment are for illustration only. Operations may be combined or the functionality of the operations may be distributed in additional operations in accordance with the invention.

Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the blocks of the flow diagram may be executed by a module (e.g., a software module) or a portion of a module or a computer system user. Thus, the above described method, the operations thereof and modules therefor may be executed on a computer system configured to execute the operations of the method and/or may be executed from computer-readable media. The method may be embodied in a machine-readable and/or computer-readable medium for configuring a computer system to execute the method. Thus, the software modules may be stored within and/or transmitted to a computer system memory to configure the computer system to perform the functions of the module.

Such a computer system normally processes information according to a program (a list of internally stored instructions such as a particular application program and/or an operating system) and produces resultant output information via I/O devices. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Such a computer system typically includes multiple computer processes executing "concurrently." Often, a computer system includes a single processing unit which is capable of supporting many active processes alternately. Although multiple processes may appear to be executing concurrently, at any given point in time only one process is actually executed by the single processing unit. By rapidly changing the process executing, a computer system gives the appearance of concurrent process execution. The ability of a computer system to multiplex the computer system's resources among multiple processes in various stages of execution is called multitasking. Systems with multiple processing units, which by definition can support true concurrent processing, are called multiprocessing systems. Active processes are often referred to as executing concurrently when such processes are executed in a multitasking and/or a multiprocessing environment.

The software modules described herein may be received by such a computer system, for example, from computer readable media. The computer readable media may be permanently, removably or remotely coupled to the computer system. The computer readable media may non-exclusively include, for example, any number of the following: magnetic storage media including disk and tape storage media; optical storage media such as compact disk media (e.g., CD-ROM, CD-R, etc.) and digital video disk storage media; nonvolatile memory storage memory including semiconductor-based memory units such as FLASH memory, EEPROM, EPROM, ROM or application specific integrated circuits; volatile storage media including registers, buffers or caches, main memory, RAM, and the like; and data transmission media including computer network, point-to-point telecommunication, and carrier wave transmission media. In a UNIX-based embodiment, the software modules may be embodied in a file which may be a device, a terminal, a local or remote file, a socket, a network connection, a signal, or other expedient of communication or state change. Other new and various types of computer-readable media may be used to store and/or transmit the software modules discussed herein.

Figure 5:
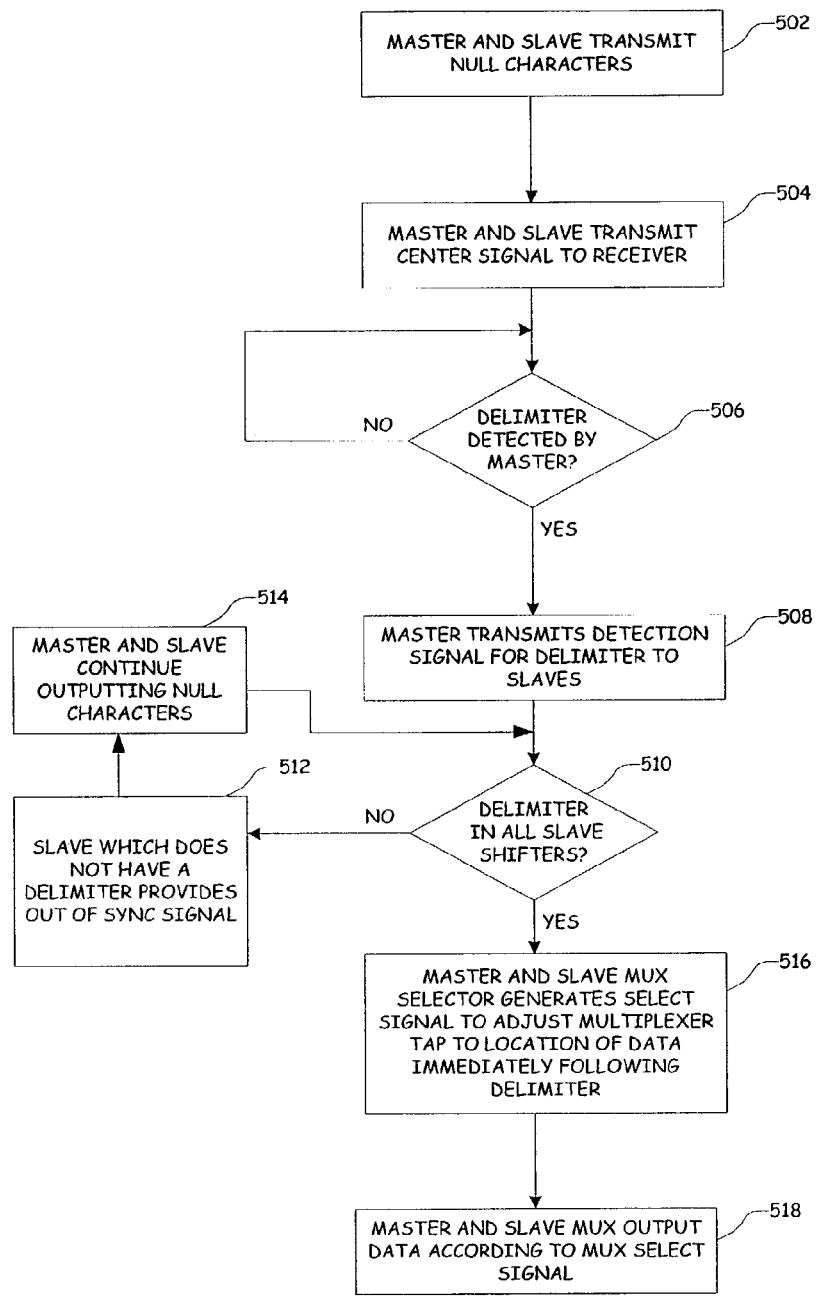
FIG. 5 is a flow chart illustrating a process of re-synchronizing data signals in accordance with one embodiment of the present invention.

FIG. 5 is a flow chart illustrating one method of resynchronizing data signals in accordance with one embodiment of the present invention. In a resynchronization state (triggered by an out of synchronization signal as described above), the master and each slave input synchronization circuit transmit null characters to their respective buffers 208 (e.g., by outputting null characters from multiplexer 212 or by marking data via deletor 206) (block 502). By providing null characters to each buffer 208, the amount of unsynchronized data, if any, which may be transmitted into each buffer 208 is minimized. Additionally, if data is not synchronized within each shifter, data is likely to be out of synchronization within the clock boundary FIFOs (not shown) of each receiver 202 as well. Because of this, the master and each slave comparator preferably transmit a center signal to the respective clock boundary FIFOs to re-center the data within the respective clock boundary FIFOs (block 504).

Although the master and each slave input synchronization circuit are configured to output null characters to their respective buffers when in the resynchronization state, receivers 202 and detectors 210 continue to receive data. When the master input synchronization circuit receives a delimiter, the master detector 210 provides a detection signal of "01" (identifying a delimiter) to each of the slave input synchronization circuits via synchronization bus 226 ("Yes" branch of decision block 506 and block 508, respectively). Each slave mux selector 218 responds to the detection signal of "01" by looking for a delimiter within the respective shifter 214. In one embodiment of the present invention, each mux selector 218 looks in shift register stages 2-7 for a delimiter. If mux selector 218 determines that a delimiter is not present within shift register stages 2-7 of shifter 214, comparator 220 asserts an out of synchronization signal ("No" branch of decision block 510 and block 512). The master and slave input synchronization circuits continue outputting null characters to their respective buffers (block 514) until each slave shifter 214 has received a delimiter in one of shifter register stages 2-7. In one embodiment of the present invention, data is padded with a number of consecutive delimiters. By providing a number of consecutive delimiters to seven shift register stages, it is anticipated that each slave shifter will receive a delimiter within a few clock cycles from the time the master has received a delimiter.

Once each slave shifter 214 has received a delimiter, each mux selector 218 (for the master and each slave) generates a select signal to adjust the tap of each multiplexer 212 to the location of the first non-delimiter data (e.g., a data character or a control character) immediately following the delimiter (block 516). In another embodiment of the present invention, each mux selector 218 (for the master and each slave) generates a select signal to adjust the tap of each multiplexer 212 to the location of the last (or only) delimiter within each respective shifter. Following this, the master and slave synchronization circuits begin outputting data to their respective buffers (block 518).

Figure 6:
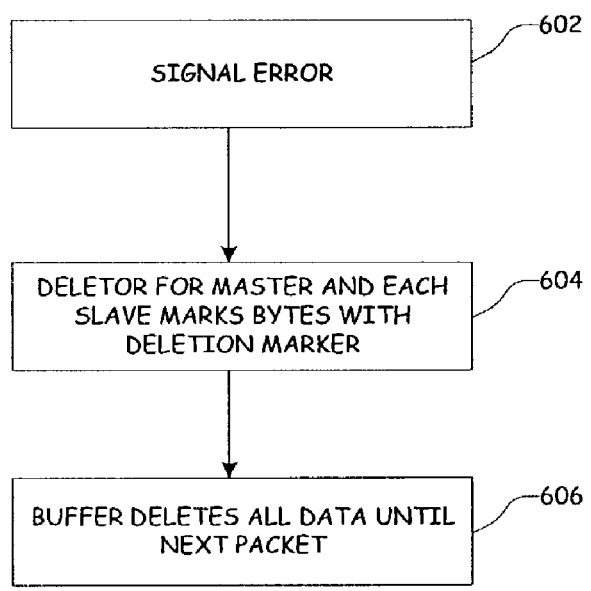
FIG. 6 is a flow chart illustrating a process of marking data signals with a deletion marker in accordance with one embodiment of the present invention.

FIG. 6 is a flow chart illustrating a process of marking data signals with a deletion marker in accordance with one embodiment of the present invention. As with FIG. 3 FIG. 6 is described with reference to FIG. 4. In order to maintain synchronization of the data provided in the respective buffers, an error received or detected by any input synchronization circuit is preferably propagated to all other input synchronization circuits via the delete signal of the synchronization bus (block 602). When this signal is asserted by any input synchronization circuit (master or slave), each respective marker 224 marks the data in three stages of shifter 222 with a deletion marker (block 604). For example, referring to FIG. 4, the data within stages 5, 6, and 7 of shifter 222 has been marked with a deletion marker. In the present embodiment, marking data with a deletion marker is accomplished by setting an individual bit in the data to a value of "1". It will be recognized that other methods of deletion can be used on fewer or less than three stages of shifter 222. Upon receipt of marked data, buffer 208 responds by deleting all data until the next non deleted delimiter is received While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

We claim:

1. An apparatus comprising:
a first integrated circuit comprising a first synchronizer, said first integrated circuit configured to receive first data; and
a second integrated circuit coupled to said first integrated circuit, said second integrated circuit configured to receive second data, wherein the second integrated circuit comprises a second synchronizer, wherein the second synchronizer is configured to synchronize said second data with said first data, wherein said first integrated circuit and said second integrated circuit are on separate substrates;
wherein the second synchronizer comprises a shift register, said shift register comprising a plurality of shift register stages, each stage comprising a data input and a data output;
wherein the second synchronizer comprises a multiplexer, said multiplexer comprising a data output and a plurality of data inputs, said multiplexer further comprising a selector input, wherein the plurality of data inputs of the multiplexer are coupled to respective outputs of said plurality of shift register stages.

2. The apparatus of claim 1 wherein
wherein said first synchronizer is configured to receive said first data; and
wherein the second synchronizer is coupled to said first synchronizer, wherein said second synchronizer is configured to receive said second data and synchronize said second data with said first data.

3. The apparatus of claim 2 wherein said second synchronizer is further configured to synchronize a second delimiter of said second data with a first delimiter of said first data.

4. The apparatus of claim 2 wherein
said first data comprises at least one delimiter and data immediately following said at least one delimiter;
said second data comprises at least another delimiter and data immediately following said at least another delimiter; and
said second synchronizer is further configured to synchronize said data immediately following said at least another delimiter with said data immediately following said at least one delimiter.

5. The apparatus of claim 1 wherein the synchronizer further comprises:
a multiplexer selector, said multiplexer selector coupled to said shift register and said multiplexer, said multiplexer selector configured to provide a tap setting to said multiplexer, said tap setting corresponding to a shift stage of said shift register in which a delimiter received by the shift register is located.

6. The apparatus of claim 1 wherein the synchronizer further comprises:
a multiplexer selector, said multiplexer selector coupled to said shift register and said multiplexer, said multiplexer selector configured to provide a tap setting to said multiplexer, said tap setting corresponding to a shift stage of said shift register in which said data immediately following a delimiter received by the shift register is located.

7. The apparatus of claim 6 wherein
said first synchronizer is configured to generate a first signal in response to receiving a first delimiter; and
said second multiplexer selector is configured to provide said tap setting in response to receiving said first signal.

8. The apparatus of claim 1 wherein the second integrated circuit further comprises:
a buffer; and
a deletor coupled to the data output of said multiplexer and an input of said buffer, wherein the deletor of the second integrated circuit is configured to generate marked data by simultaneously marking respective data when said data is out of synchronization, and the buffer is configured to delete said marked data.

9. The apparatus of claim 1 wherein said second integrated circuit is further configured to detect when said second data is out of synchronization with said first data.

10. The apparatus of claim 1 further comprising:
a third integrated circuit coupled to said first and said second integrated circuit, said third integrated circuit configured to transmit said first data and said second data to said first and said second integrated circuit, respectively.

11. The apparatus of claim 1 wherein said second integrated circuit is one of a plurality of integrated circuits configured to receive respective data and synchronize said respective data with said first data, wherein each of said plurality of integrated circuits is on a respective substrate.

12. A method comprising:
receiving first data, said first data received by a first shift register of a first integrated circuit, wherein the first data comprises a first delimiter;
receiving second data, said second data received by a second shift register of a second integrated circuit, wherein the second data comprises a second delimiter, wherein said second shift register comprises a plurality of shift register stages, each stage comprising a data input and a data output;
transmitting a signal in response to said first integrated circuit receiving the first delimiter;
in response to said signal, coupling an output of a multiplexer to a shift register stage of said second shift register in which a second delimiter is located;
wherein said first integrated circuit is coupled to said second integrated circuit, and said first integrated circuit and said second integrated circuit are on separate substrates.

13. The method of claim 12 further comprising:
synchronizing the first delimiter of said second data with the second delimiter of said first data.

14. The method of claim 12 further comprising:
synchronizing data immediately following the first delimiter of said first data with data immediately following the second delimiter of said second data.

15. The method of claim 12 further comprising:
transmitting said first delimiter from said first shift register; and
synchronously transmitting said second delimiter from said second shift register.

16. The method of claim 12 further comprising:
transmitting said data immediately following said first delimiter from said first shift register; and
synchronously transmitting said data immediately following said second delimiter from said second shift register.

17. The method of claim 12 further comprising:
if said second data is out of synchronization with said first data, deleting said first and said second data.

18. The method of claim 12 further comprising:
transmitting said first and said second data to said first and said second integrated circuits, respectively.

19. The method of claim 12 further comprising detecting when said second data is out of synchronization with said first data.

20. A system comprising:
a first means for receiving first data, wherein the first data comprises a first delimiter;
a second means for receiving second data, wherein the second data comprises a second delimiter, wherein the first means is coupled to the second means, and wherein the first and second means are on separate substrates; and
means for synchronously transmitting said first and second delimiters from said first and second means, respectively.

21. The system of claim 20 further comprising:
means for synchronizing data immediately following the first delimiter of said first data with data immediately following the second delimiter of said second data.

22. The system of claim 20 further comprising:
means for synchronously transmitting said data immediately following said first and second delimiters.

23. The system of claim 20 further comprising:
means for deleting said first and said second data if said second data is out of synchronization with said first data.

24. The system of claim 20 further comprising:
means for transmitting said first and said second data to said first and said second integrated circuits, respectively.

25. The system of claim 20 further comprising:
means for detecting when said second data is out of synchronization with said first data.

26. A computer program product encoded in computer readable media, said computer program product comprising:
a first set of instructions, executable on a computer system, configured to synchronize second data received by a second integrated circuit with first data received by a first integrated circuit, wherein said first integrated circuit and said second integrated circuit are on separate substrates;

a second set of instructions, executable on said computer system, configured to synchronize a second delimiter of said second data with a first delimiter of said first data;

a third set of instructions, executable on said computer system, configured to transmit said first delimiter from said first synchronizer; and a fourth set of instructions, executable on said computer system, configured to synchronously transmit said second delimiter from said second synchronizer.

27. The computer program product of claim 26 further comprising:

a fifth set of instructions, executable on said computer system, configured to synchronize data immediately following the first delimiter with data immediately following the second delimiter.

28. The computer program product of claim 27 further comprising:

a sixth set of instructions, executable on said computer system, configured to transmit said data immediately following said first delimiter from said first synchronizer; and a fifth set of instructions, executable on said computer system, configured to synchronously transmit said data immediately following said second delimiter from said second synchronizer.

29. The computer program product of claim 26 further comprising:

a fifth set of instructions, executable on said computer system, configured to delete said first and said second data if said second data is out of synchronization with said first data.

30. The computer program product of claim 26 further comprising:

a fifth set of instructions, executable on said computer system, configured to transmit said first and said second data to said first and said second integrated circuits, respectively.

31. The computer program product of claim 26 further comprising:

a fifth set of instructions, executable on said computer system, configured to detect when said second data is out of synchronization with said first data.

32. An apparatus comprising:

a first integrated circuit coupled to a second integrated circuit, wherein said first integrated circuit and said second integrated circuit are on separate substrates;

said first integrated circuit comprising a first shift register configured to receive first data, wherein the first shift register comprises a plurality of first shift register stages, each first stage comprising a data input and a data output;

said first integrated circuit further comprising a first multiplexer, wherein the first multiplexer comprises a data output and a plurality of data inputs, wherein the plurality of data inputs of the first multiplexer are coupled to respective outputs of said plurality of first shift register stages;

said second integrated circuit comprising a second shift register configured to receive second data, wherein the second shift register comprises a plurality of second shift register stages, each second stage comprising a data input and a data output;

said second integrated circuit further comprising a second multiplexer, wherein the second multiplexer comprises a data output and a plurality of data inputs, wherein the plurality of data inputs of the second multiplexer are coupled to respective outputs of said plurality of second shift register stages;

wherein the first and second shift registers are configured to receive the first and second data, respectively, at different times;

wherein the first and second multiplexers are configured to output the first and second data, respectively, at the same time.

* * * * *